Feb. 9, 1943. W. J. EMMONS ET AL 2,310,358
ASPARAGUS PROCESSING MACHINE
Filed Aug. 3, 1940 2 Sheets-Sheet 1
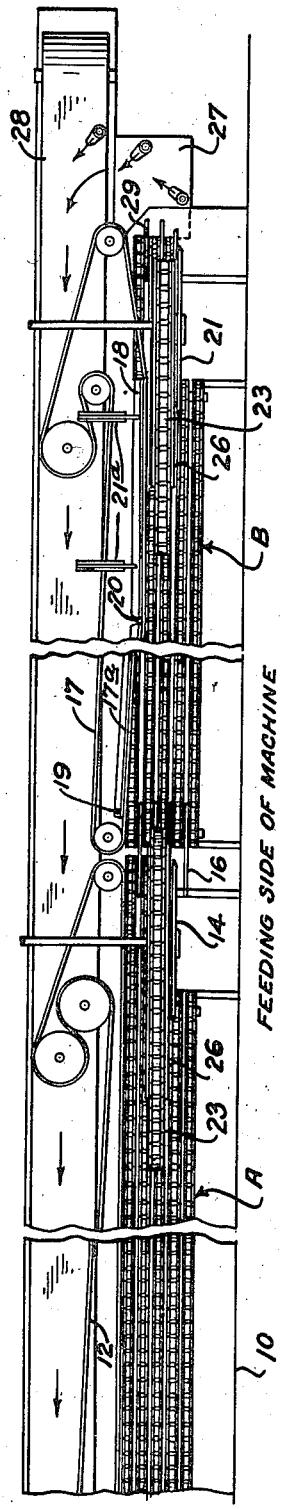
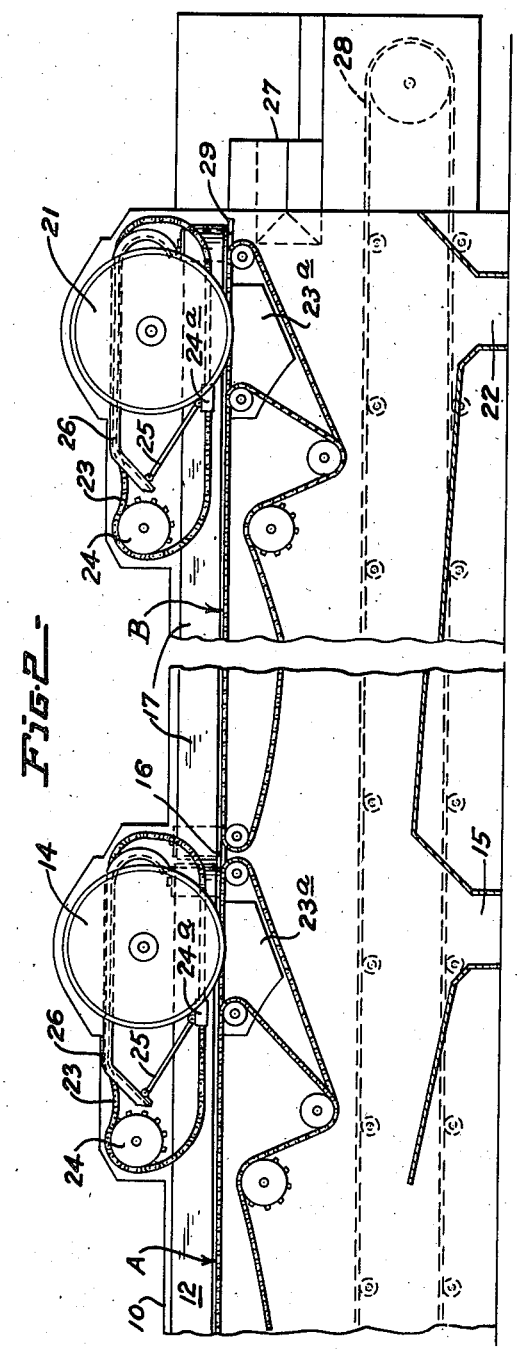
INVENTORS
WILLIAM J. EMMONS
BERNARD S. GALLAGHE
BY
Oscar A. Melli
ATTORN'

Feb. 9, 1943.  W. J. EMMONS ET AL  2,310,358
ASPARAGUS PROCESSING MACHINE
Filed Aug. 3, 1940  2 Sheets-Sheet 2
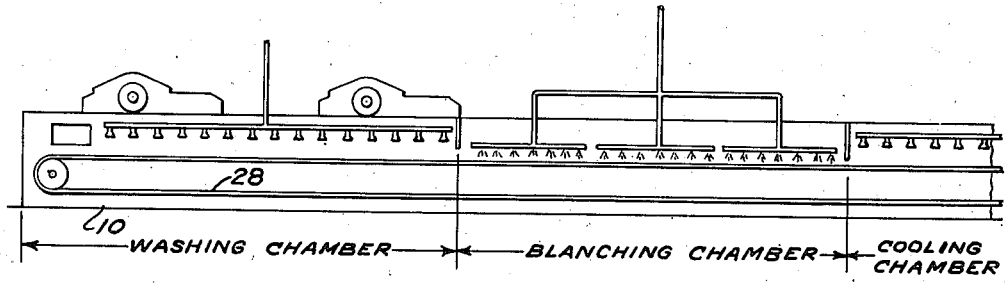
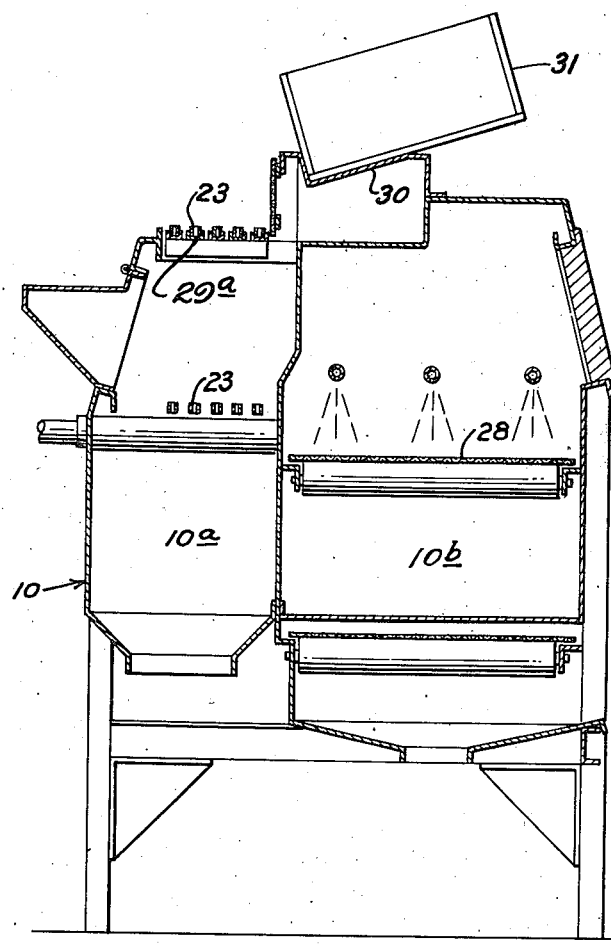
INVENTOR.
WILLIAM J. EMMONS
BERNARD S. GALLAGHER
BY
Oscar A. Mellin
ATTORNEY.

Patented Feb. 9, 1943

2,310,358

UNITED STATES PATENT OFFICE 2,310,358

ASPARAGUS PROCESSING MACHINE

William J. Emmons, Alameda, and Bernard S. Gallagher, Piedmont, Calif.

Application August 3, 1940, Serial No. 350,950

7 Claims. (Cl. 146—81)

This invention relates to machines for processing asparagus for packing.

It is the principal object of the present invention to provide an improved machine for efficiently cutting asparagus to a predetermined length and then successively washing, blanching and cooling the same in a continuous operation, which machine is of large capacity and requires but a minimum of attendance in its operation.

In practicing our invention, we provide a machine which includes a primary conveyor and a secondary conveyor arranged in alignment and on the same plane, but operating at relatively different speeds. A cutter is provided for each conveyor and arranged at different points laterally of said conveyors so as to enable both a trim and a finish cut to be obtained. The asparagus is fed to the primary conveyor with only approximately correct positioning of the spears thereon and thereafter the trim cut is effected. The asparagus is transferred thereafter to the secondary conveyor and automatically adjusted so that the tips thereof are in correct alignment so that upon the subsequent finish cut the spears will be of uniform length, whereafter they are deposited on a conveyor which conveys them successively through washing, blanching and cooling chambers to complete the processing thereof.

One form which the invention may assume is exemplified in the following description and illustrated by way of example in the accompanying drawings, in which:

Fig. 1 is a plan view generally diagrammatic of a machine embodying the preferred form of our invention.

Fig. 2 is a central longitudinal section through the feeding and cutting section of the machine.

Fig. 3 is a diagrammatic view of the machine disclosing the relative arrangement of the washing, blanching and cooling chambers.

Fig. 4 is a transverse sectional view taken through the machine and disclosing certain features of its construction.

Referring more particularly to the accompanying drawings, we have there illustrated our improved machine for cutting asparagus spears into a predetermined length and thereafter washing, blanching and cooling the same, either for the purpose of canning or like purposes.

In general, the asparagus spears are fed to the machine manually and thereafter the asparagus is so disposed as it passes through the machine that it may be inspected and rejected spears removed prior to the finishing process of the machine.

In general, the machine comprises an elongated tank 10 which is divided into two longitudinal sections 10a and 10b which we will here term, for the purpose of description, a feeding and cutting section 10a and a washing, blanching and cooling section 10b. The tank 10, of course, is provided with the necessary mechanical elements for supporting the various operating mechanisms of which the machine is comprised and in that respect also comprises the frame of the machine.

Referring particularly to Fig. 1, where we illustrate in plan the feeding and cutting mechanism of the machine, it will be seen that arranged horizontally and longitudinally of the cutting and feeding section is a primary feed conveyor A, which is composed of a series of parallel strands of chain belts, all operating at the same speed and which form a flat top conveyor of a width agreeing somewhat with the length of the spears of asparagus as they are brought from the field. We prefer that the length of this primary conveyor A be approximately thirty feet. However, this length may be varied as varying the length of this conveyor to some degree affects the capacity of the machine. This conveyor is, of course, continuously driven in synchronism with the remainder of the operating mechanism of the machine by a suitable power means.

The primary feed conveyor A is driven at a comparatively slow rate of speed in order that operators stationed at intervals along the feeding side of the machine may position the asparagus spears transversely upon the upper flight of the feed conveyor A with the tips innermost. We have found that the most desirable rate of speed of the primary feed conveyor A is that which enables the operators to stack the asparagus on the upper flight thereof as described by simply grasping bunches of asparagus from boxes or trays with both hands and stacking that quantity on the top flight of the conveyor without any attempt to spread them or stack them to an even depth. Thus, the speed of the conveyor is such that asparagus can be stacked in that fashion rapidly by the operators without the latter being required to stack it either evenly or to any predetermined height. This gives the machine large capacity.

It is necessary, however, that there be some means provided in conjunction with this primary conveyor A for approximately positioning the tip ends of the asparagus relative to a revolving trim cut knife 14 arranged adjacent one end of the primary conveyor A for the purpose of trim cutting the asparagus fed to the conveyor A. For this purpose we provide an endless guide belt 12 which is arranged to operate with the plane of its flights at ninety degrees to the primary feeding conveyor A with one flight extending parallel to the feeding conveyor A and vertically with respect thereto along the inner edge of the latter. The lower edge of this flight of the belt 12 is just slightly below the upper surface of the top flight of the primary feed conveyor A and slightly to one side of the same as illustrated on the drawings. This belt 12 is driven at the same speed and in the same direction as the primary feeding conveyor A and provides a vertical travelling guide to limit the inward position of the tip ends of the asparagus so that all of the asparagus stacked on the primary feeding conveyor A may be rapidly stacked manually with the tip ends in approximate alignment adjacent the guide flight of the conveyor A.

One of the features of the present machine is that it is unnecessary for the operator to take the time necessary to place the tip ends of all the spears of asparagus in contact with the guide belt 12 and see that they are all in perfect alignment. We have found in actual practice that it is impossible for the feeding operators to work with desired rapidity in so feeding asparagus to see that all of the spears of asparagus are properly aligned in the first feeding operation. Therefore, the present machine enables the operators to very rapidly feed the asparagus to the machine with but a slight amount of attention as to whether or not the spears are in actual contact with the guide belt 12, it being only necessary that the tips of the asparagus be somewhat approximately positioned with respect to the belt 12. The latter, of course, aids in this operation.

With a line of operators positioned along the feeding side of the machine, that is along the primary feed conveyor A, it is obvious that the layer of asparagus positioned on the conveyor A will be somewhat uniform in depth as the last of the line of operators will fill in the valleys and more or less roughly spread the asparagus on the primary conveyor A as it reaches its end.

It will be noticed from Fig. 1 that the outermost two strands of the chains which comprise the primary conveyor A are shorter than the remainder and terminate just slightly short of the trim cutting knife 14. This knife 14 is of the disc-revoluble type and suitable for cutting the asparagus fed by it. It is positioned laterally with respect to the conveyor A intermediate the second and third strands of the primary conveyor A, as indicated, and at a distance from the guide belt 12 sufficiently to properly trim cut the asparagus, leaving all of the spears sufficiently long for packing regardless of the fact that some of the spears were not exactly positioned up against the guide belt 12. Obviously, the lateral position of the trim cutting knife 14 with respect to the guide belt 12 may be adjusted within the limits of the width of the feed conveyor A, if it is necessary or desirable to change the length of the cut spears of asparagus to conform to changed packing conditions. This adjustment of the knife 14 may be accomplished in any suitable manner by changing the position of the knife manually or any desirable fashion known to those skilled in the art.

The cut off ends of the spears of asparagus will drop downwardly at the exterior of the knife blade into the cutting section of the tank and may there discharge through a hopper 15 and into containers for removal or in any other desired fashion.

Arranged in endwise alignment with the primary feed conveyor A is a secondary feed conveyor B which is constructed in a fashion similar to that of feed conveyor A and whose flat top flight is on the same plane as the flat top flight of the primary feed conveyor A. These two conveyors are in longitudinal alignment and the ends thereof are contiguous, the slight space occurring between the adjacent ends being bridged by a fixed grate 16 of suitable design. Thus the asparagus trimmed by the knife 14 may be transferred from the primary feed conveyor A to the secondary feed conveyor B, the latter, of course, travelling in the same direction as the primary conveyor A. However, the secondary feed conveyor B travels at a comparatively higher rate of speed than the primary feed conveyor A. By this relative change in speeds between the conveyors A and B the asparagus is automatically caused to deposit on the conveyor B in a layer which is considerably less in depth than the layer to which the asparagus is stacked on the primary feed conveyor A. Also, this relative change in speeds between the conveyors aids in making the comparatively thin layer of asparagus on the secondary conveyor B to be more or less uniform in depth. By thus considerably automatically lessening the depth of the layer of asparagus on the feed conveyor B, the operators positioned along this conveyor have ample opportunity to inspect the spears passing therealong for rejection of those that are unsuitable.

Cooperating with the secondary feed conveyor B is means for automatically aligning the tip ends of the asparagus so that upon the finished cut they will be almost exactly the same length. This means comprises an aligning belt 17 arranged along the inner side edge of the secondary conveyor B, but with the flight of the belt 17 being on a plane at ninety degrees to the plane of the upper flight of the feed conveyor B. The flight 17a of the belt 17 is arranged generally along the inner longitudinal margin of the feed conveyor B, but overlapping the same, and for this purpose it is positioned with its lower edge slightly above the plane of the top flight of the secondary feed conveyor B.

Cooperating with this guide flight 17a of the belt 17 is an adjustment bar 18 which is hinged at one end to the tank as at 19 and is jointed as at 20 to provide two rigid sections which are hinged together. Suitable adjustment means 21a are provided for moving this bar laterally with respect to the feed conveyor B so as to enable adjustment of the guide flight 17a of the belt 17 transversely of the feed conveyor B, and thereby enable adjustment of the length of the finished cut of asparagus. However, the guide flight 17a and the adjustment bar 18 have another function, which is an important one, and which is to cause automatic alignment of the tip ends of the asparagus being conveyed along by the conveyor B. It will be noticed that at the point approximately aligning with the hinged point 19 of the bar 18, the guide flight 17a of the belt 17 is approximately aligned with the inner marginal edge of the conveyor B, but at the point 20, where the two sections of the adjustment bar 18 are hinged together, the guide flight 17a of the belt 17 is positioned inwardly relative to the marginal edge of the conveyor B so that for a distance between the points 19 and 20 the flight 17a of the belt 17 is positioned angularly with respect to the conveyor B, with the point 20 being positioned further outermost so that the spears of the asparagus being conveyed by the conveyor B will be moved and adjusted in their position on the conveyor so that all of the tips thereof will be in alignment at the time they reach the point 20. The belt 17 is, of course, driven in the same direction and at the same speed as the conveyor B.

The outer two strands of the conveyor B are likewise shorter than the remainder thereof, as illustrated in Fig. 1, and between these two strands and the remainder is positioned a finish cutting knife 21 identical to that previously referred to as 14. This knife operates to finish cut the asparagus as it reaches the end of the conveyor B, the first two strands of that conveyor being shorter than the remainder to enable the center cuts to drop downwardly and discharge through the chute 22 in the tank. Deflectors 23a are provided below each knife to aid in directing the discharged portions to the chutes 22, without coming in contact with any of the operating mechanism in that longitudinal section of the tank. The cut ends discharging through the hopper 15 are waste, while the center cuts discharging through the hopper 22 are useful in that they may be preserved for soup stock and other uses.

We provide means for holding the spears of asparagus against displacement while the same are being acted upon by the cutters 14 and 21. The means in each instance is identical and comprises a very loose heavy chain belt 23 arranged around sprockets 24 over the underlying feed conveyor. This chain is arranged over the cutting station, that is arranged over the conveyor on both sides of the cutter, as illustrated in Fig. 2. The chain is driven in the same direction and at the same speed as the underlying feed conveyor, but it is extremely loose, and its lower flight, which bears on the layer of asparagus on the feed conveyor, is fitted with a weight 24a carried by a vertically pivotal arm 25 fastened to a guide 26 for the upper flight of the conveyor, which in turn is fixed to the tank or frame of the machine. The mechanism for the cutter 21 is identical with that for the cutter 14.

From the foregoing it is seen that when the spears of asparagus reach the cutter 21, their tip ends are abutted against the guide flight 17a of the belt 17 and, consequently, after they are cut by the cutter 21, all of the spears are of the same length and the cut off portions or center cuts are discharged from the machine through the chute 22. The spears then discharge from the end of the secondary conveyor B and are guided by an inclined guide plate or chute 27 into the washing, blanching and cooling section of the tank. Arranged in this section considerably below the feed conveyors is an endless conveyor 28, the upper flight of which runs in a direction opposite that of the upper flight of the feed conveyors A and B. During the transfer from the feeding and cutting section of the machine the spears are subjected to the washing action of spray nozzles, which spray the same with water with sufficient velocity to remove dirt therefrom.

It will be noticed that the transfer plate or chute 27 is somewhat below the upper flight of the secondary conveyor B and at the end of said conveyor belt are a plurality of transfer fingers 29 of graduated length, as shown in Fig. 1, the outermost of which is the shortest one. This places the shorter fingers at the butt end of the asparagus so that as the latter pass off of the fingers to descend to the chute 27, they will drop butt foremost, which insures against breaking of the tender tips of the spears of asparagus.

The construction of the plate or chute 27 is such, together with the arrangement of the spray nozzles thereabout, that the spears of asparagus will deposit on the upper flight of the conveyor 28 and be conveyed thereby throughout the entire length of the washing, blanching and cooling section of the machine, and then be discharged as desired. We prefer that the conveyor belt 28 discharge the thus processed spears on a packing table for packing into cans, cartons or other containers for preserving.

From Fig. 3 it will be seen that the conveyor 28 first passes through a washing chamber, thence through a blanching chamber in which the asparagus is subjected to steam emanating from jets properly positioned in said chamber, and thence it passes through a cooling chamber in which it is subjected to the cooling action of cold water sprayed thereon from properly positioned nozzles.

We desire to point out that we prefer that all of the operating mechanism associated with the primary feed conveyor A be driven by one motor and that all of the operating mechanism associated with the feed conveyor B be driven by a second motor, the two, however, being properly synchronized to obtain the correct relative speeds of the two conveyors as previously described. We have not here in detail illustrated the actual driving mechanism nor the motors as it is obvious that the various operating mechanisms may be so driven synchronously by mechanism of conventional type and design.

In operation of our machine, it is constructed and assembled as shown in the drawings and asparagus is delivered in any desired manner to the operators who line the feeding side of the machine at proper intervals. As asparagus is harvested and delivered with all the tips extending in one direction and with the spears lying approximately parallel to each other, it is a simple matter for the feeding operators to simply grasp a bunch of spears with two hands and place them on the primary feed conveyor A with the tip ends approximately positioned at the guide flight of the conveyor 12. It is unessential, however, that the tips be exactly aligned with the guide flight of the belt 12, which enables the operators to work much faster in feeding the machine so that the machine will have a large capacity, and in this way a comparatively deep layer of asparagus becomes positioned on the primary feed conveyor A. This is necessary, of course, if the machine is to have a large capacity and to run at comparatively high speed.

In practice we run the conveyor A at a speed which enables a minimum number of operators to stack the spears of asparagus thereon to a depth of approximately five or six inches, and we have found that with a layer of such depth, it is almost impossible for the operators to stack the same with the tip ends all in absolute alignment against any sort of a guide such as the guide flight of the belt 12, and if any such attempt is made, that the production of the machine is materially decreased and the same will have a compartively small capacity. Therefore, it is only necessary that the tips be approximately adjacent the guide flight of the belt 12.

Thereafter as the asparagus passes toward the end of the primary conveyor A it is held in position by the link belt 23 and is trim cut by the cutter 14. The cut ends, as previously described, drop downwardly into the tank and are discharged through the chute 15. The asparagus thus cut is then transferred across the grate 16 (which has a straightening effect on the spears) to the secondary feed conveyor B, which operates at a speed comparatively faster than the speed of the primary conveyor A. This causes the asparagus to be automatically spread in parallel position on the secondary conveyor B in a comparatively thin layer which is more or less uniform in depth. The ends of the asparagus, as it travels along the top flight of the conveyor B, are engaged by the angularly positioned portion of the guide flight 17a of the guide belt 17, and due to the fact that the layer is comparatively thin, this guide belt will align the tips of the asparagus so that when subsequently cut, the spears will be of uniform length. This would be impossible to do with a comparatively heavy or deep layer of asparagus. As the asparagus is moved along in this fashion by the secondary conveyor B, it is subject to the inspection of operators standing along the feeding side of the machine so that such operators may remove from the conveyor those spears which are undesirable. Of course, the operators can closely inspect the asparagus due to the fact that the layer is comparatively thin on this conveyor.

As the asparagus moves along the top flight of the conveyor B, it is engaged by the weighted holding down belt 23 and cut to the finish length by the cutter 21, the cut off portions discharging downwardly through the tank and thence through the chute 22, while the stalks or spears cut to finish length are diverted into the washing, blanching and cooling section of the tank and onto the conveyor 28, as previously described. In descending from the secondary conveyor B to the belt 28 the spears will descend butt first due to the provision of the fingers 29, as previously described. After being deposited on the conveyor 28, the asparagus is conveyed successively through the washing, blanching and cooling chambers and is thereafter ready for packing.

We wish to call particular attention to the fact that the chains which form the conveyor belts A and B provide a perfectly flat surface on which the spears of asparagus are deposited and that no pockets or like depressions are formed to hold the asparagus, thus enabling the operators to stack the asparagus on the conveyor A at random without the necessity of aligning the same with any pockets or like depressions in a belt.

For the purpose of holding the strands of the conveyors A and B of the upper flight in a true flat plane, the said strands are run in fixed rigid guide rails 29a, as illustrated in Fig. 4 of the drawings. On top of the tank, as illustrated in Fig. 4, is a rack 30 which is useful for holding boxes 31 into which rejected spears of asparagus may be deposited by the operators or feeders.

From the foregoing it is obvious that we have provided a highly efficient machine for cutting asparagus to an accurate length and then successively washing, blanching and cooling the same, which machine will have a large capacity due to its unique features and will operate with a minimum of attendance, and while we have shown the preferred form of our invention, it is to be understood that various changes may be made in its construction by those skilled in the art without departing from the spirit of the invention as defined in the appended claims.

Having thus described our invention, what we claim and desire to secure by Letters Patent is:

1. In a machine of the character described, a pair of longitudinally aligned feeding conveyors operating in the same direction, the second of said conveyors operating at a higher speed than the first of said conveyors to spread a thick layer of asparagus deposited on and received from said first conveyor in a materially thinner layer, abutment means extending along and closely adjacent to the same sides of said conveyors, asparagus cutting means for each conveyor positioned inwardly thereof from said abutment means, the transverse distance between said second conveyor cutting means and its cooperable abutment means being less than the transverse distance between said first conveyor cutting means and its cooperable abutment means.

2. In a machine of the character described, a pair of longitudinally aligned feeding conveyors operating in the same direction, the second of said conveyors operating at a higher speed than the first of said conveyors to spread a thick layer of asparagus deposited on and received from said first conveyor in a materially thinner layer, and abutment means for each conveyor and extending along and closely adjacent to the same sides of said conveyors, the abutment means for the second of said conveyors being capable of automatically aligning the tip ends of the asparagus deposited thereon by causing transverse movement of the asparagus in a direction toward the opposite side of the conveyor, asparagus cutting means for each conveyor positioned inwardly thereof from said abutment means, the transverse distance between said second conveyor cutting means and its cooperable abutment means being less than the transverse distance between said first conveyor cutting means and its cooperable abutment means.

3. In a machine of the character described, a pair of longitudinally aligned feeding conveyors operating in the same direction, the second of said conveyors operating at a higher speed than the first of said conveyors to spread a thick layer of asparagus deposited on and received from said first conveyor in a materially thinner layer, abutment means extending along and closely adjacent to the same sides of said conveyors, said abutment means moving in the same general direction and at the same speed as said conveyors, asparagus cutting means for each conveyor positioned inwardly thereof from said abutment means, the transverse distance between said second conveyor cutting means and its cooperable abutment means being less than the transverse distance between said first conveyor cutting means and its cooperable abutment means.

4. In a machine of the character described, a pair of longitudinally aligned feeding conveyors operating in the same direction, the second of said conveyors operating at a higher speed than the first of said conveyors to spread a thick layer of asparagus deposited on and received from said first conveyor in a materially thinner layer, and abutment means for each conveyor extending along and closely adjacent to the same sides of said conveyors, said abutment means traveling in the same general direction and at the same speed as the conveyors, the abutment means for the second conveyor being slightly angled with respect to the line of travel of said second conveyor so as to automatically align the tip ends of asparagus deposited on said second conveyor by causing transverse movement of the asparagus deposited on the second conveyor in a direction toward the side of the conveyor opposite the abutment means, asparagus cutting means for each conveyor positioned inwardly thereof from said abutment means, the transverse distance between said second conveyor cutting means and its cooperable abutment means being less than the transverse distance between said first conveyor cutting means and its cooperable abutment means.

5. In a machine of the character described, a pair of longitudinally aligned feeding conveyors operating in the same direction, the second of said conveyors operating at a higher speed than the first of said conveyors to spread a thick layer of asparagus deposited on and received from said first conveyor in a materially thinner layer, abutment means extending along and closely adjacent to the same sides of said conveyors, asparagus cutting means for each conveyor positioned inwardly thereof from said abutment means, the transverse distance between said second conveyor cutting means and its cooperable abutment means being less than the transverse distance between said first conveyor cutting means and its cooperable abutment means, and means overlying said conveyors for engaging the asparagus deposited thereon as it approaches the cutting means for holding the asparagus from displacement during the cutting operations.

6. In a machine of the character described, a pair of longitudinally aligned feeding conveyors operating in the same direction, the second of said conveyors operating at a higher speed than the first of said conveyors to spread a thick layer of asparagus deposited on and received from said first conveyor in a materially thinner layer, abutment means for each conveyor extending along and closely adjacent to the same sides of said conveyors, said abutment means traveling in the same general direction and at the same speed as the conveyors, the abutment means for the second conveyor being slightly angled with respect to the line of travel of said second conveyor so as to automatically align the tip ends of asparagus deposited on said second conveyor by causing transverse movement of the asparagus deposited on the second conveyor in a direction toward the side of the conveyor opposite the abutment means, asparagus cutting means for each conveyor positioned inwardly thereof from said abutment means, the transverse distance between said second conveyor cutting means and its cooperable abutment means being less than the transverse distance between said first conveyor cutting means and its cooperable abutment means, and means overlying said conveyors for engaging the asparagus deposited thereon as it approaches the cutting means for holding the asparagus from displacement during the cutting operations.

7. In a machine of the character described, a pair of longitudinally aligned feeding conveyors operating in the same direction, the second of said conveyors operating at a higher speed than the first of said conveyors to spread a thick layer of asparagus deposited on and received from said first conveyor in a materially thinner layer, abutment means extending along and closely adjacent to the same sides of said conveyors, said abutment means moving in the same general direction and at the same speed as said conveyors, asparagus cutting means for each conveyor positioned inwardly thereof from said abutment means, the transverse distance between said second conveyor cutting means and its cooperable abutment means being less than the transverse distance between said first conveyor cutting means and its cooperable abutment means, and means associated with each cutting means and overlying said conveyors for engaging the top of the layer of asparagus deposited thereon as it approaches the cutting means and for holding the asparagus from displacement during the cutting operations.

WILLIAM J. EMMONS.
BERNARD S. GALLAGHER.